Figure 1:
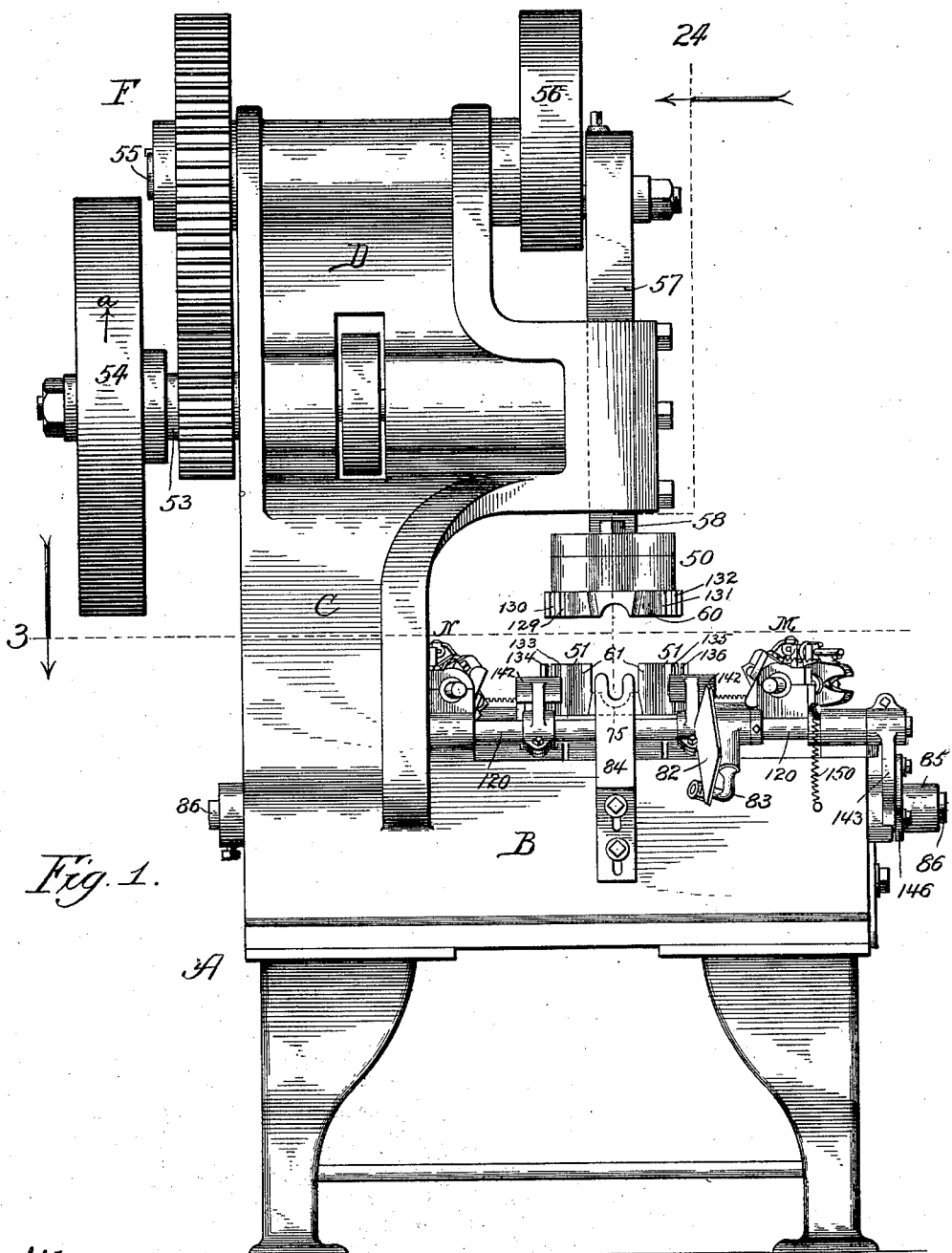

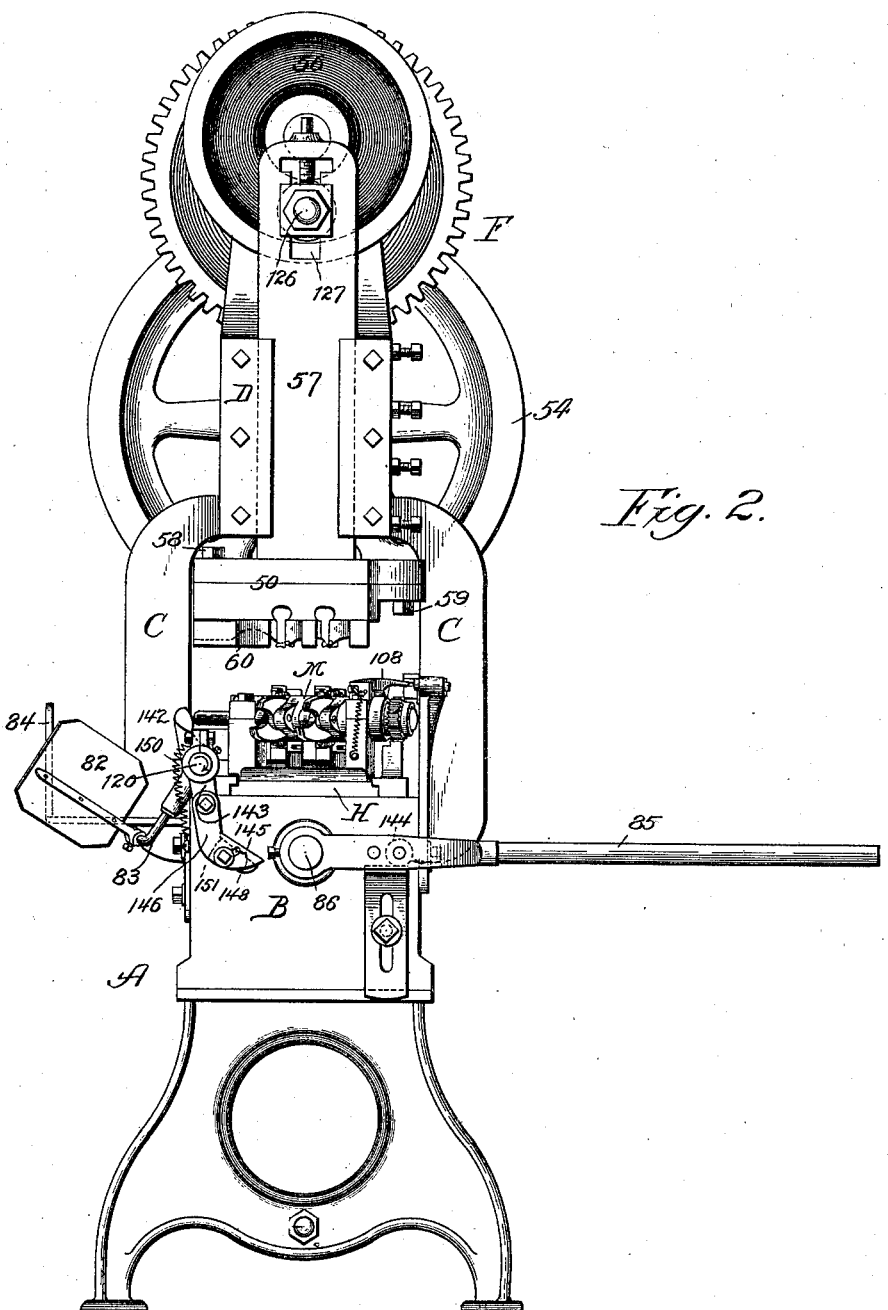

No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 1.

Witnesses: Inventor:
Samuel P. Fraley,
John Enders Jr. By Robert Catherwood
Atty

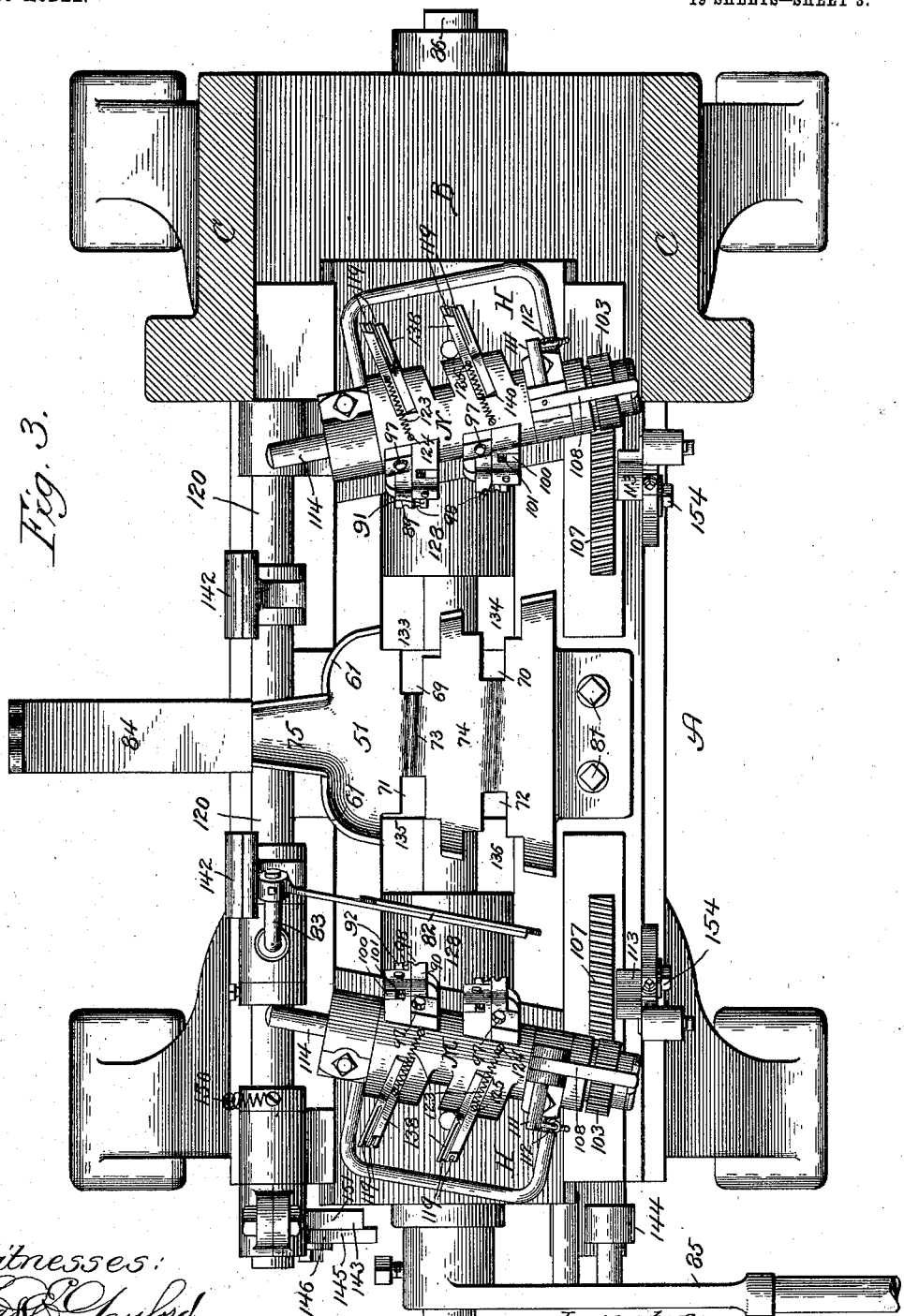

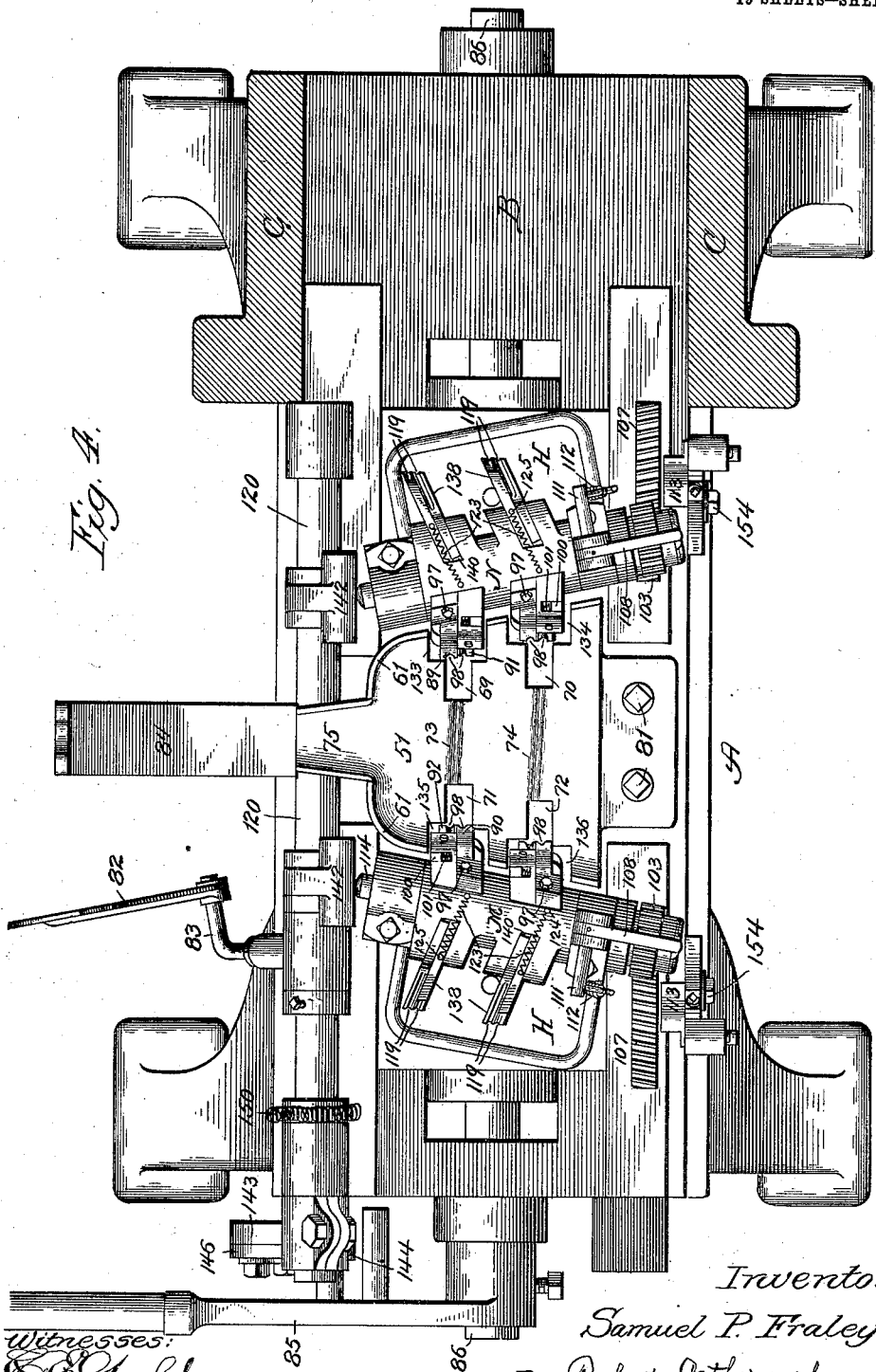

No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 5.
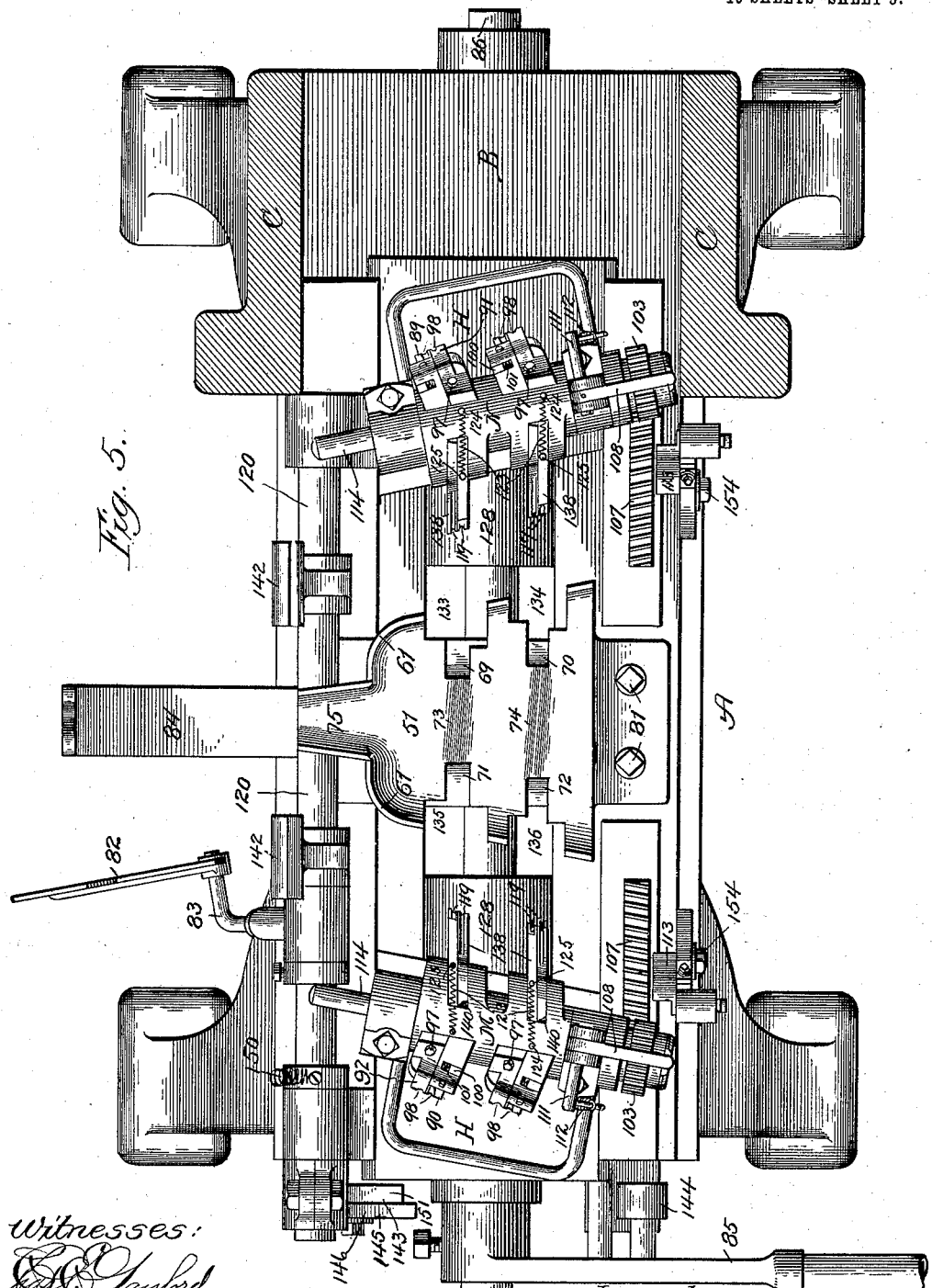
Witnesses:
Inventor:
Samuel P. Fraley
By Robert Catherwood
Att'ys No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 6.

Witnesses:
Inventor:
Samuel P. Fraley.
By Robert Catherwood
Att'ys

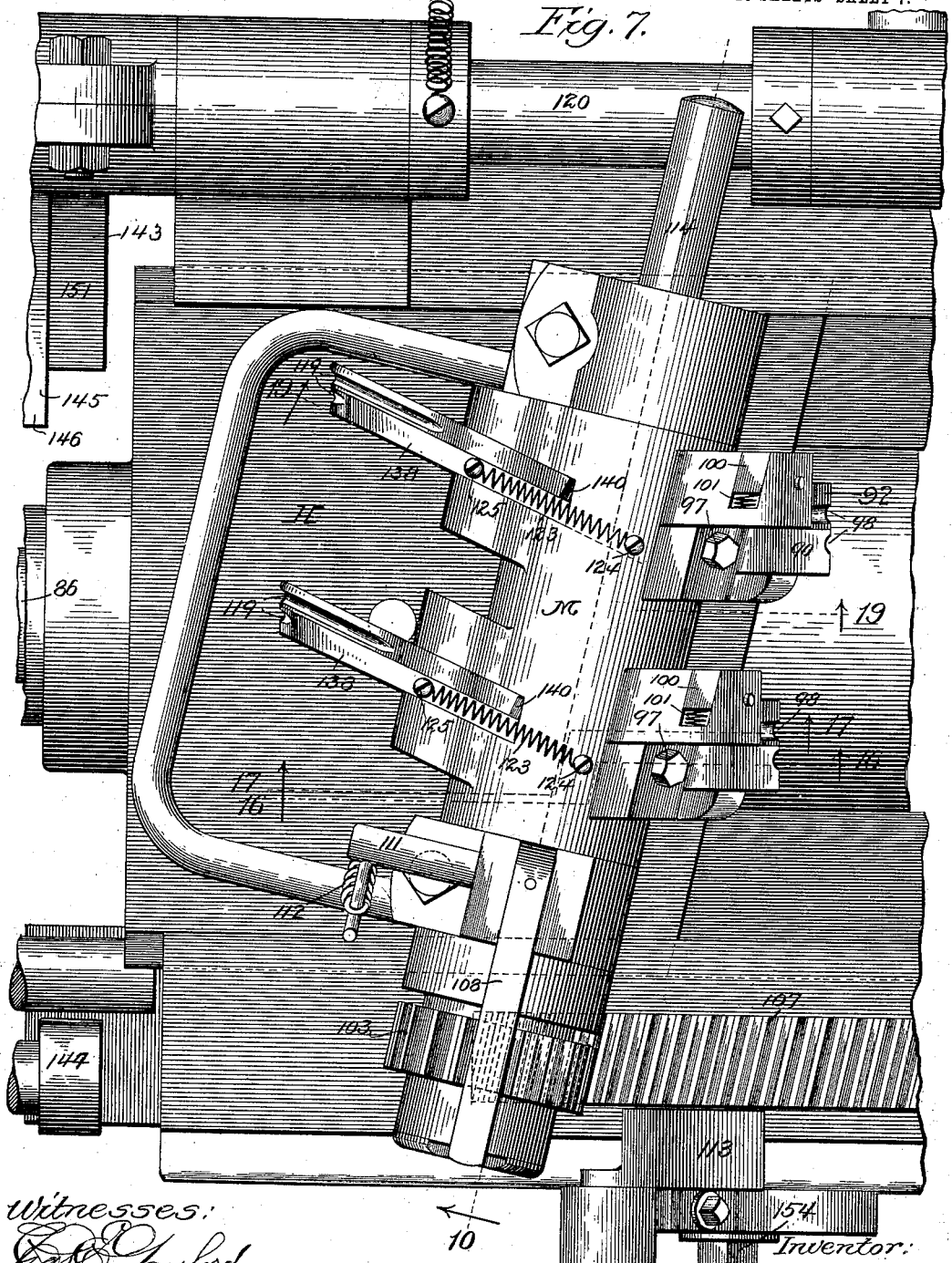

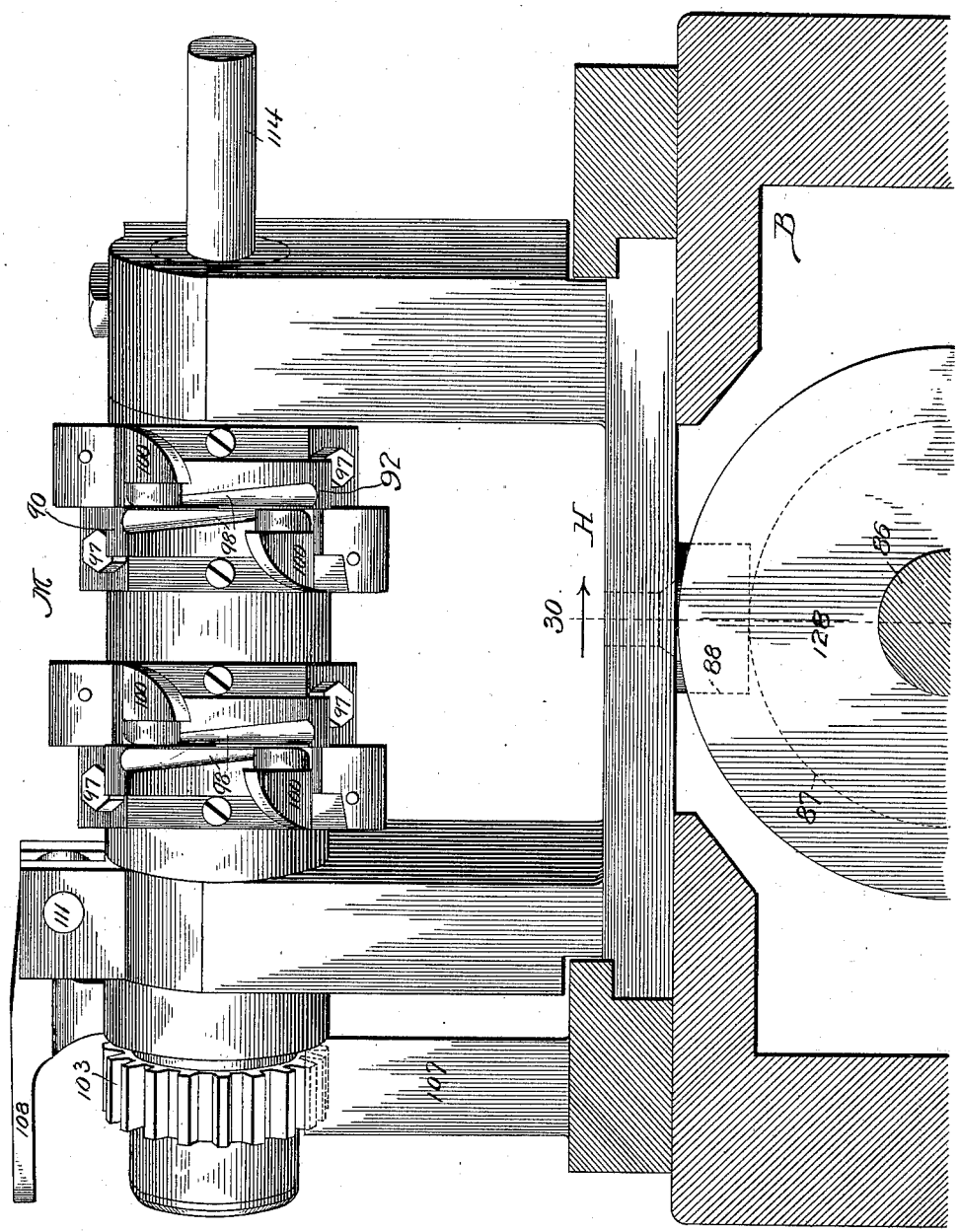

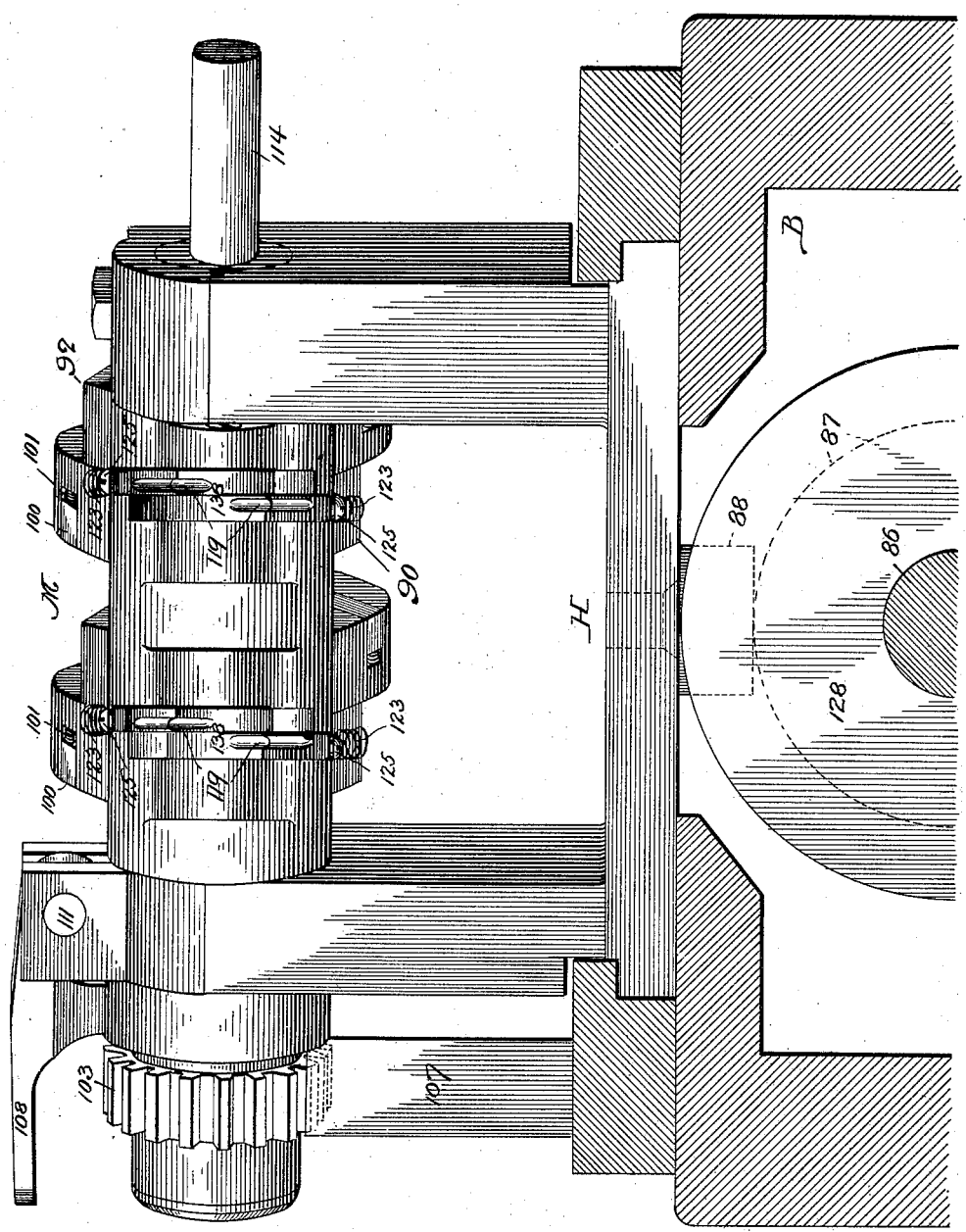

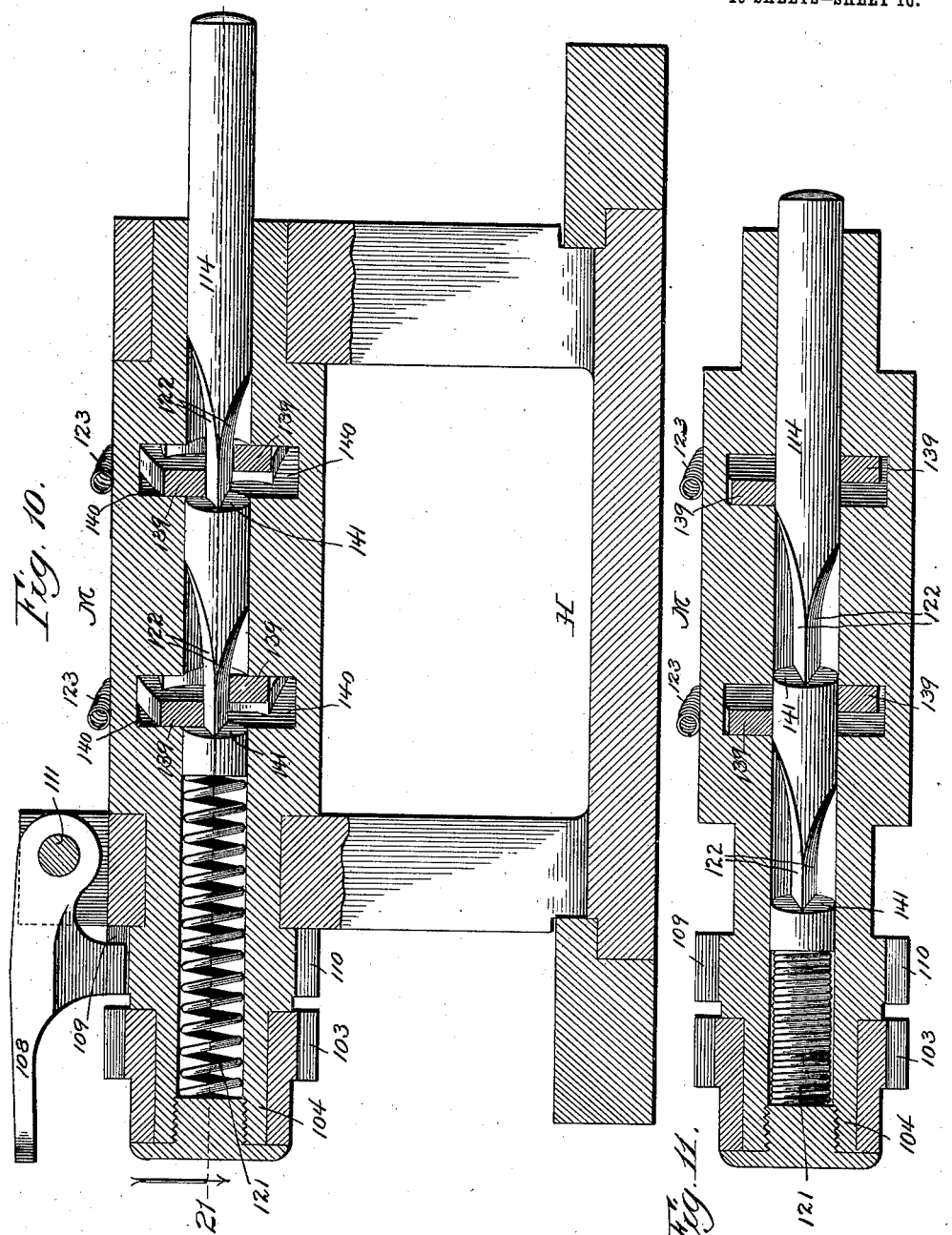

No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 11.
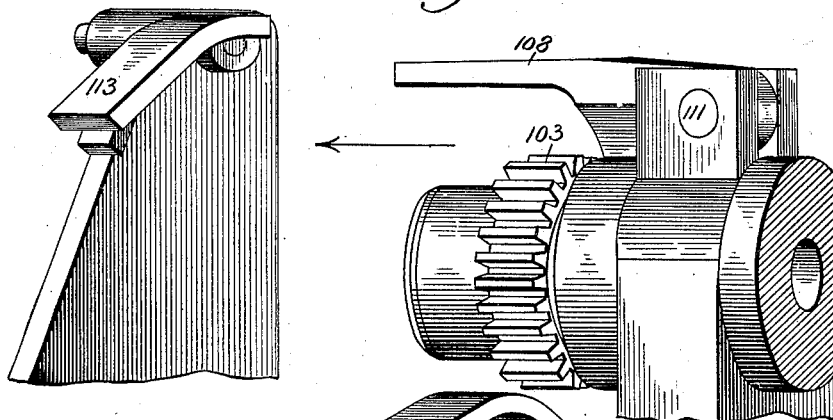
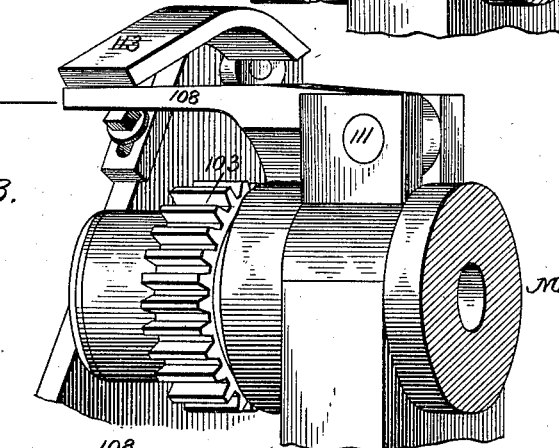
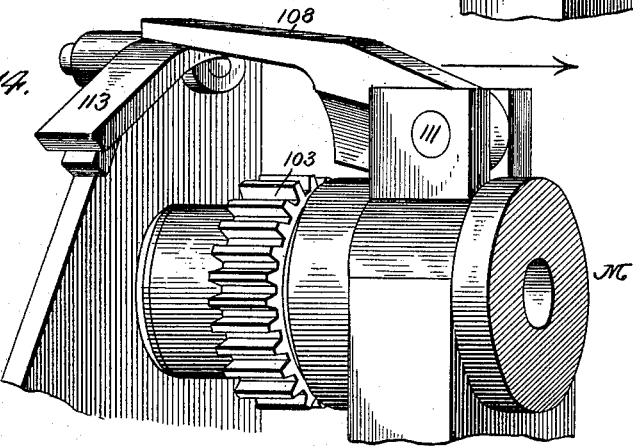
Witnesses:
Inventor:
Samuel P. Fraley.
By Robert Catherwood.
Att'y No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 12.
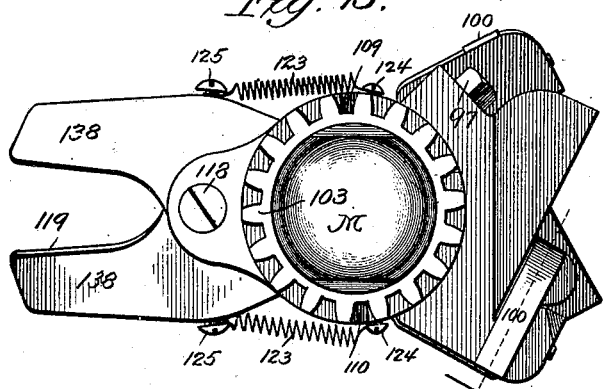
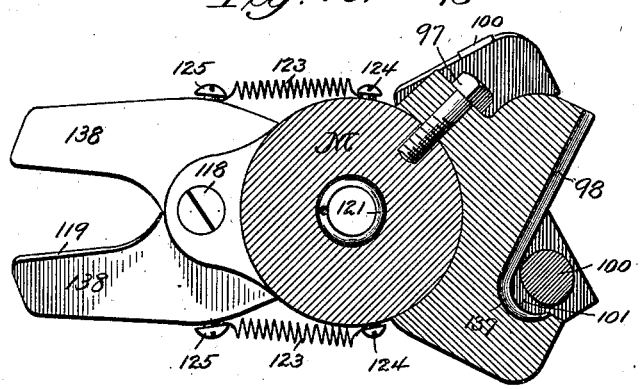
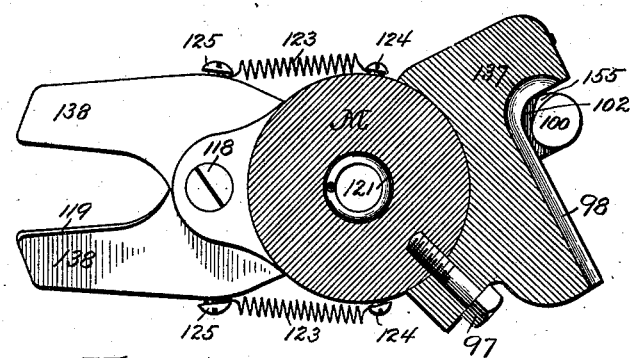
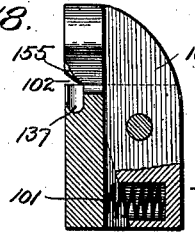
Witnesses:
Inventor:
Samuel P. Fraley
By Robert Catherwood
Att'y No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 13.
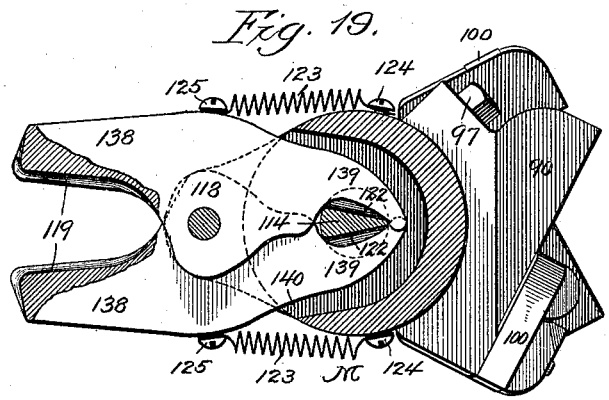
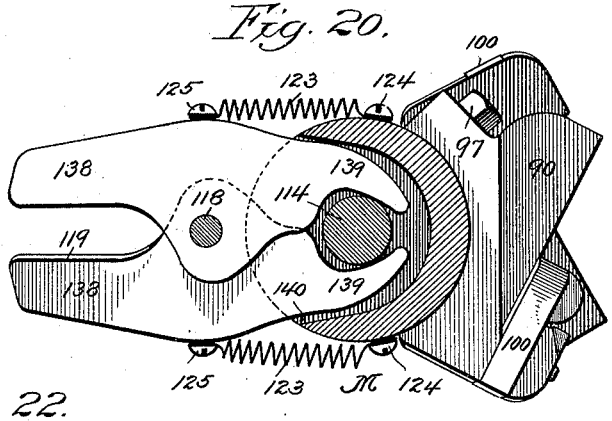
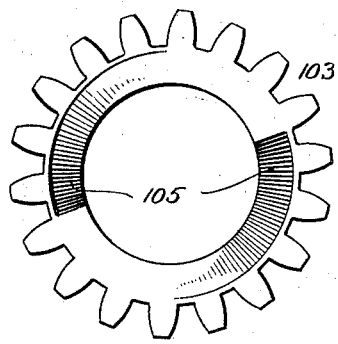
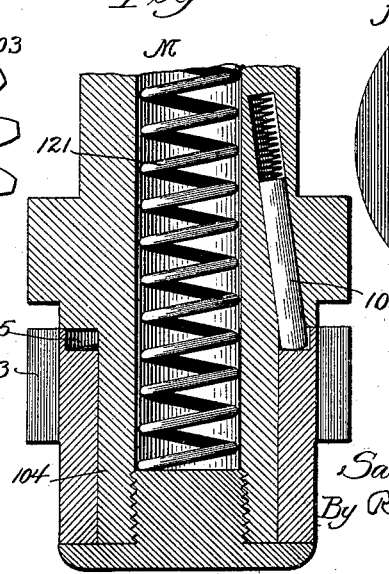
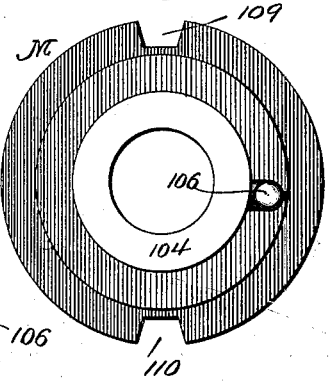
Witnesses:
Inventor:
Samuel P. Fraley
By Robert Catherwood
Att'y No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 14.

Witnesses:
Inventor:
Samuel P. Fraley
By Robert Catherwood
Att'y

No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 15.
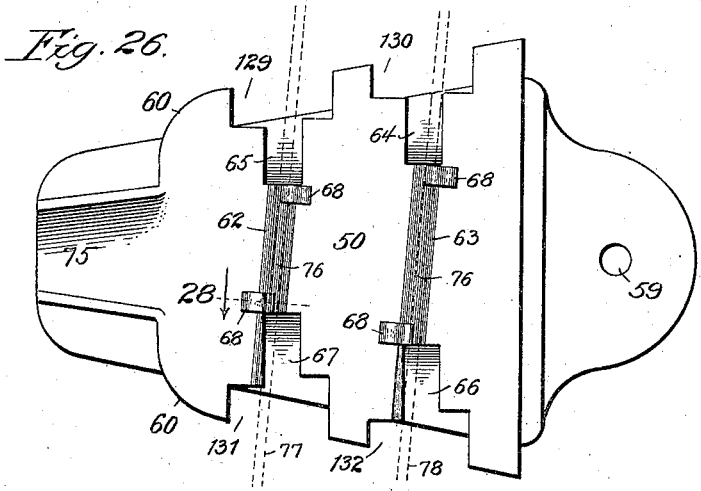
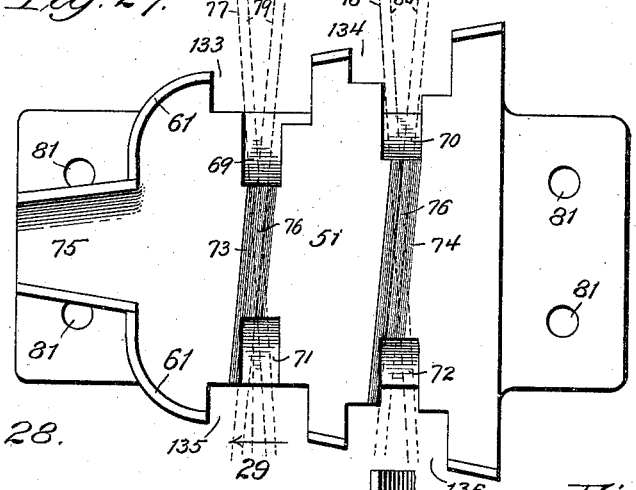
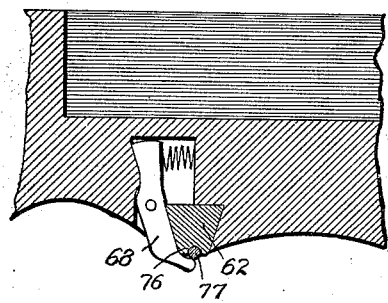
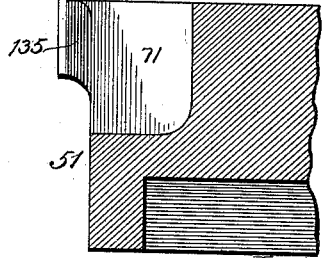
Witnesses:
Inventor:
Samuel P. Fraley,
By Robert Catherwood
Att'y No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 16.
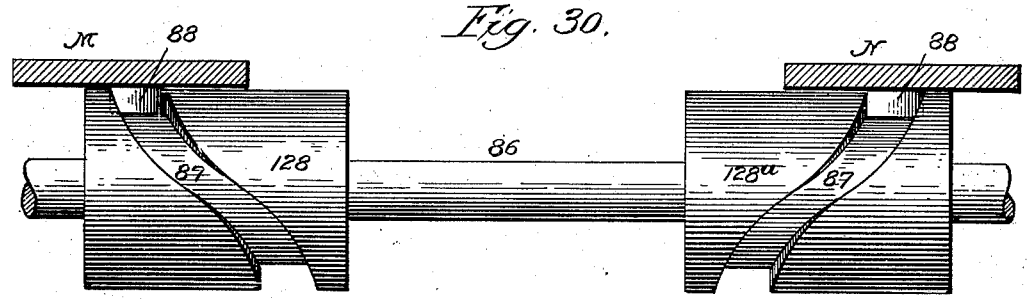
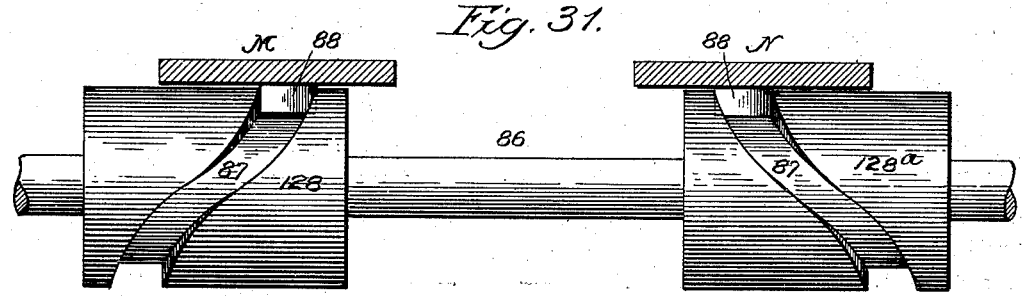
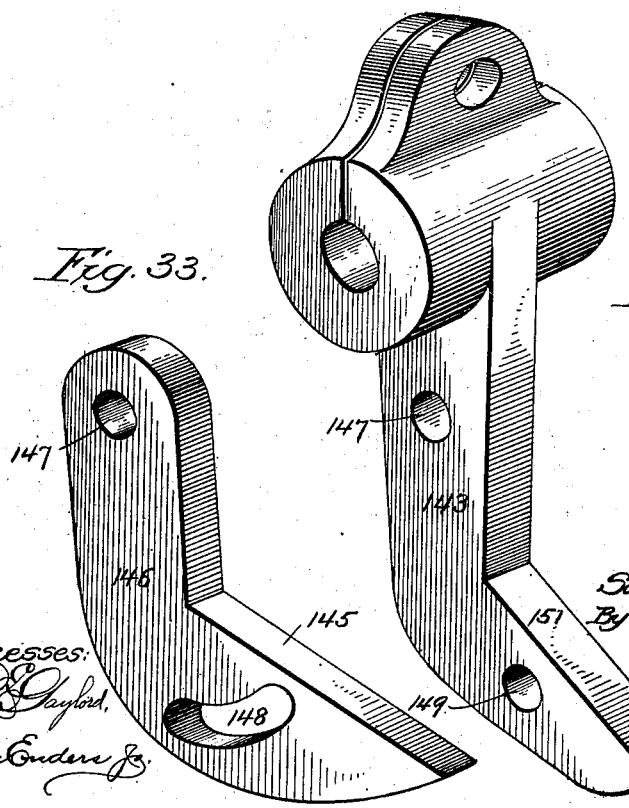
Inventor:
Samuel P. Fraley
By Robert Catherwood
Att'y No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 17.
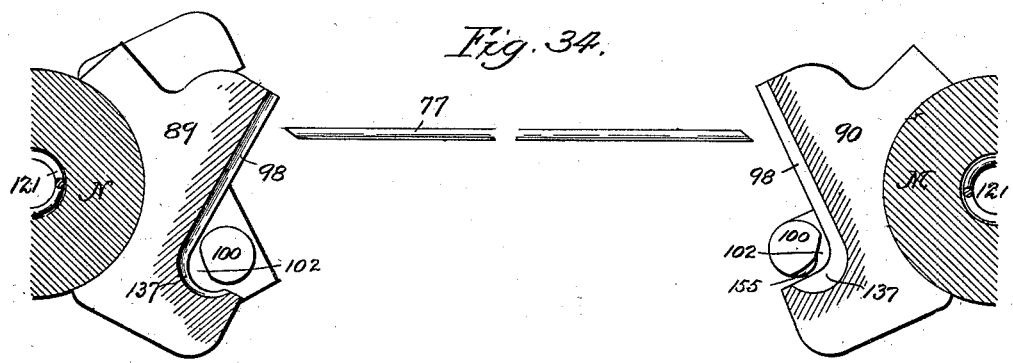
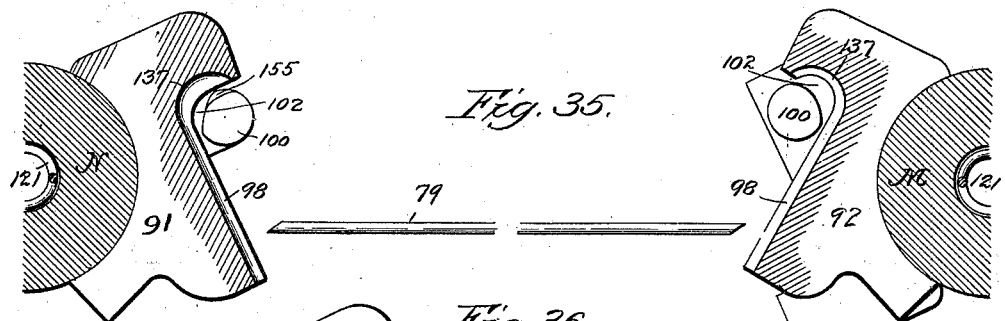
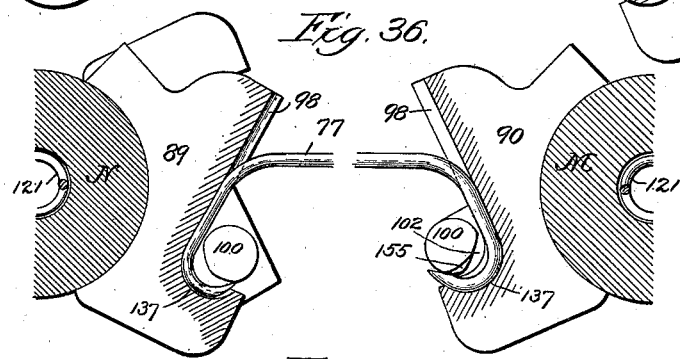
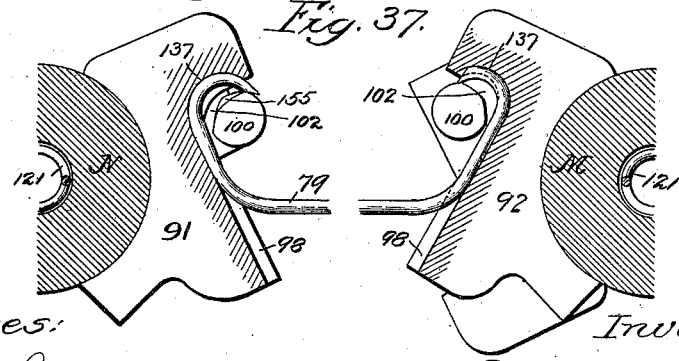
Witnesses:
Inventor:
Samuel P. Fraley
By Robert Catherwood
Att'y No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 18.

Witnesses:
Inventor:
Samuel P. Fraley,
By Robert Catherwood
Att'y

No. 757,103. PATENTED APR. 12, 1904.
S. P. FRALEY.
BROOM BINDING MACHINE.
APPLICATION FILED MAY 22, 1903.
NO MODEL. 19 SHEETS—SHEET 19.

Witnesses:
Chas. L. Gaylord.
John Enders Jr.

Inventor:
Samuel P. Fraley
By Robert Catherwood
Att'y

THE NORRIS PETERS CO., PHOTO-LITHO., WASHINGTON, D. C.

No. 757,103. Patented April 12, 1904.

UNITED STATES PATENT OFFICE.

SAMUEL P. FRALEY, OF CHICAGO, ILLINOIS.

BROOM-BINDING MACHINE.

SPECIFICATION forming part of Letters Patent No. 757,103, dated April 12, 1904.

Application filed May 22, 1903. Serial No. 158,272. (No model.)

*To all whom it may concern:*

Be it known that I, SAMUEL P. FRALEY, a citizen of the United States, residing at Chicago, Cook county, Illinois, have invented a new and useful Improvement in Broom-Binding Machines, of which the following is a specification.

The object of my invention is the construction of a machine which shall securely bind broom-blanks into the desired shape and, further, to effect this in such manner as to prevent future shrinkage or loosening of the straw and prolong the life of the broom, while adapting the machine to the manufacture of brooms of different widths and sizes. I accomplish this result by subjecting the blank (or shapeless bunch of straw secured at one end to a handle) to a heavy pressure between the dies of the desired shape, each carrying bands or wires in position for binding, and by bending and clenching the ends of these wires into the straw before removing the pressure in such manner as to press the straw between them and to loop their ends around on either side and turn them into the straw, so that they will maintain the compression and will not spring or pull off in ordinary use after pressure is removed or expose the ends.

In the accompanying drawings, wherein like letters and numbers denote like parts throughout the several figures, I have shown a machine embodying the preferred form of my invention.

Figure 6:
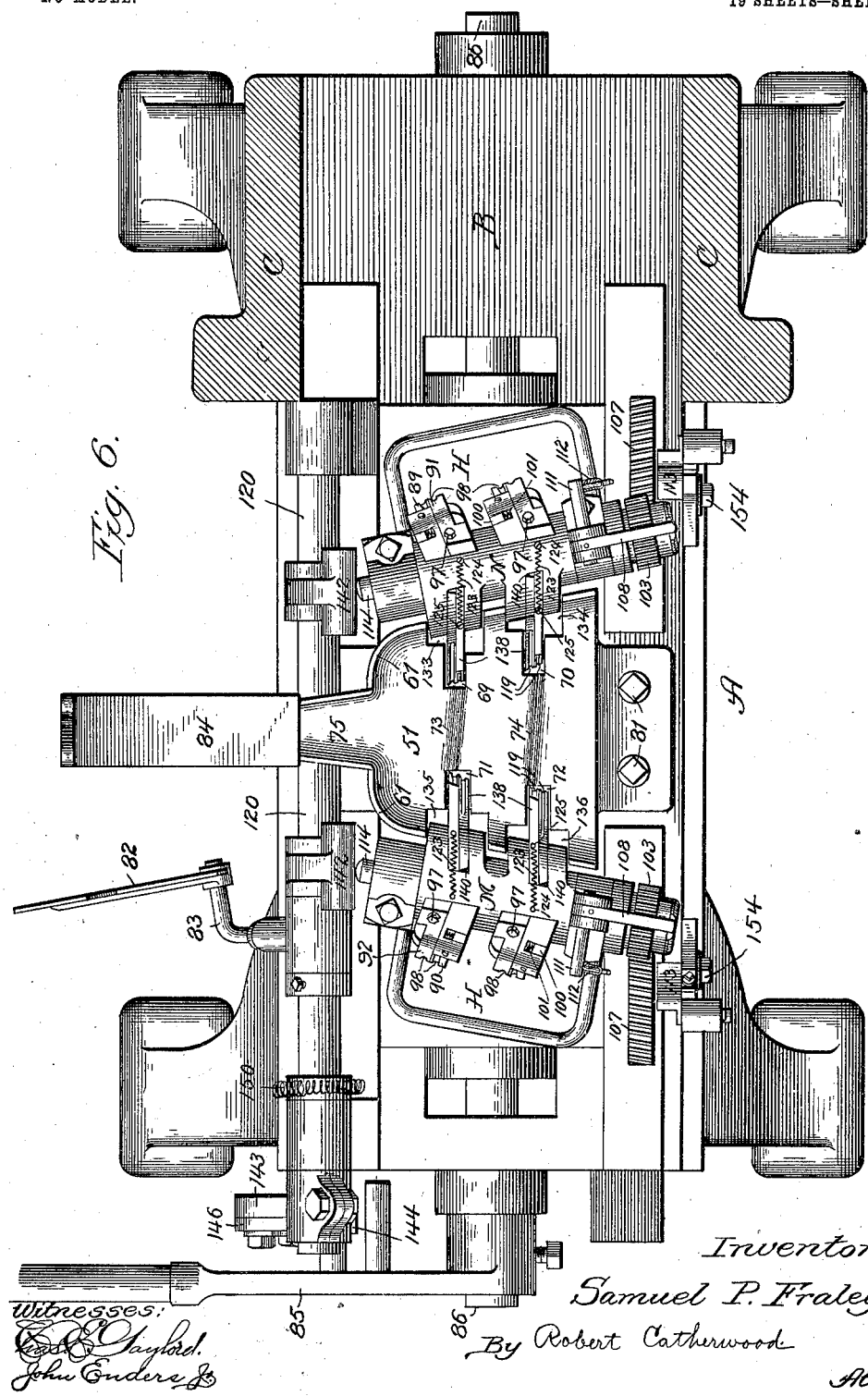
Figure 24:
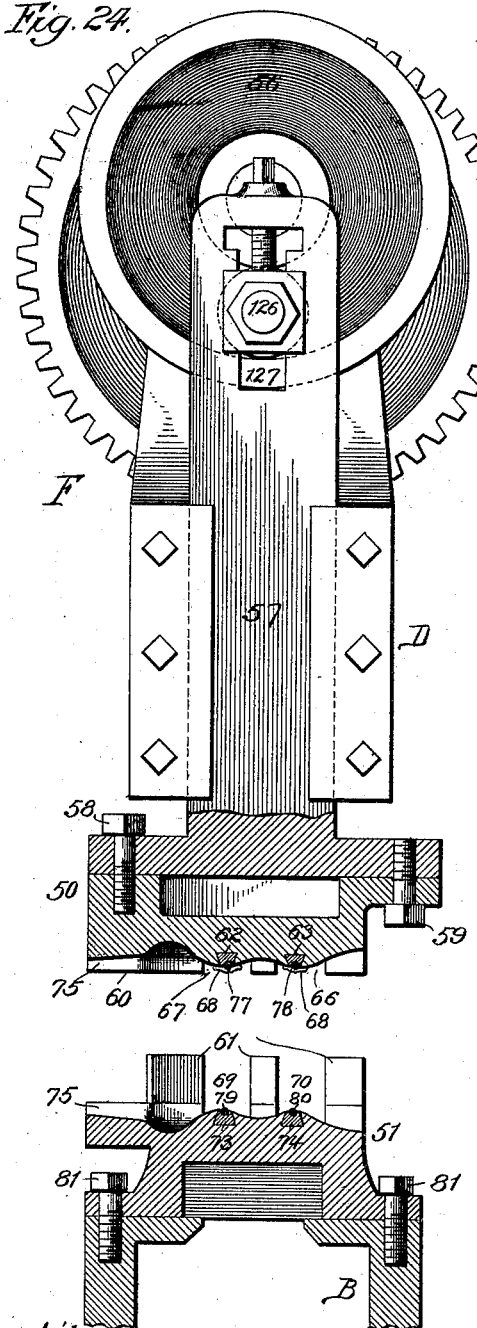
Figure 25:
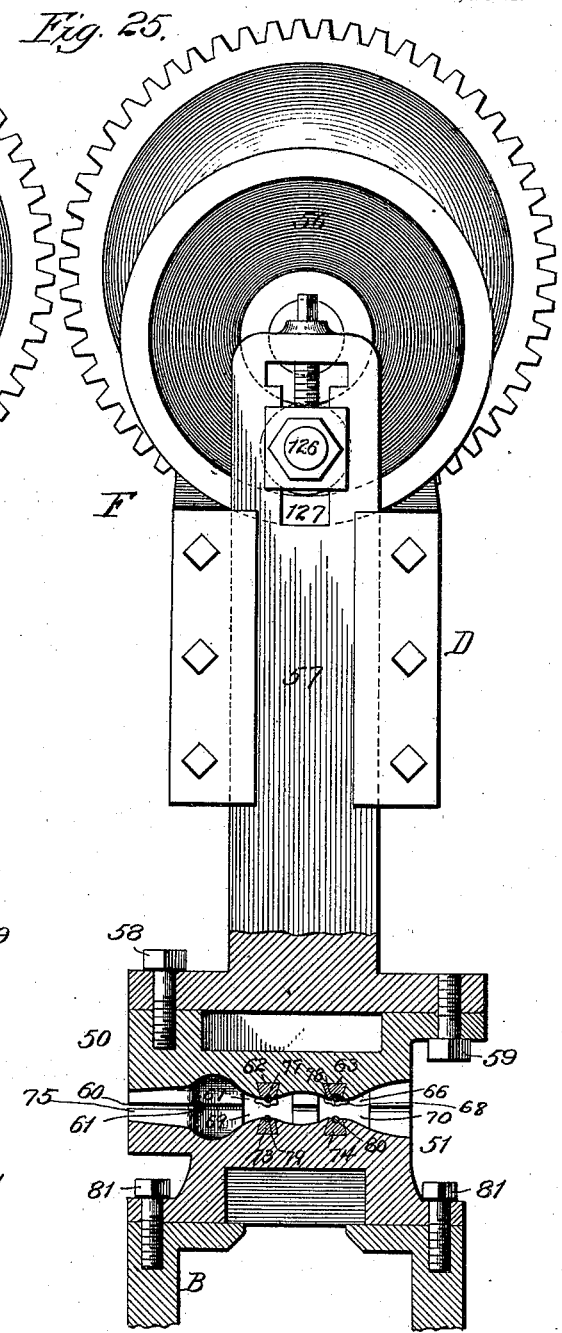
Figure 38:
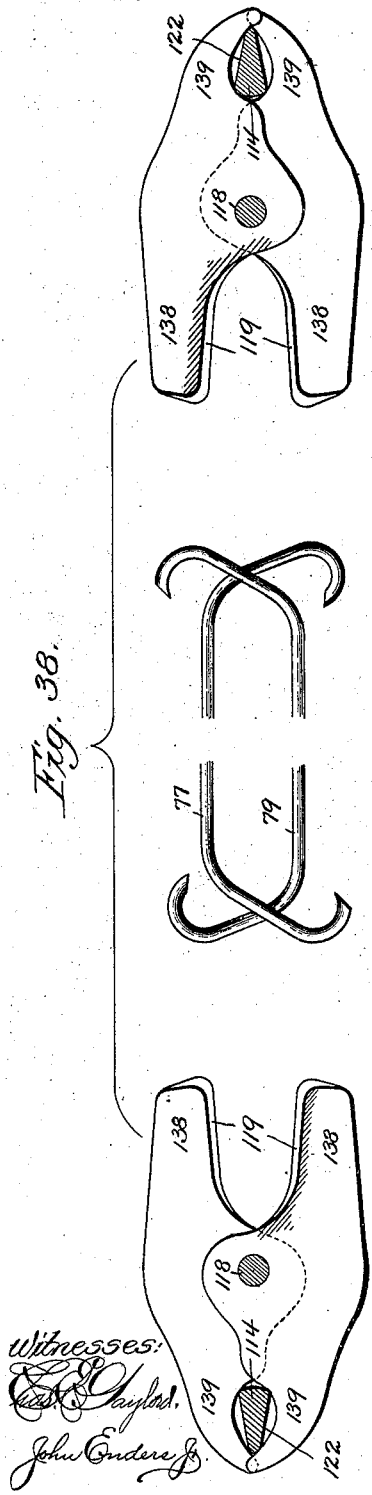
Figure 39:
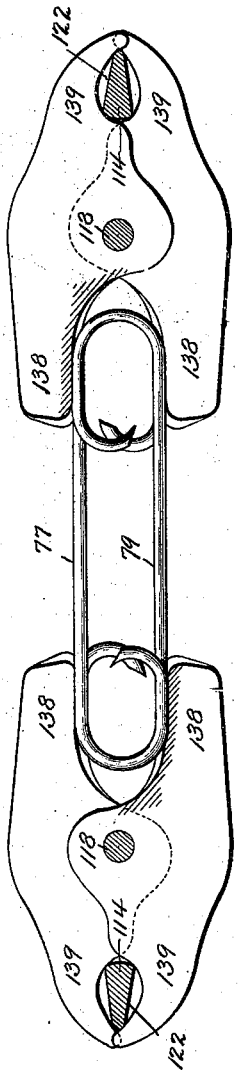
Figure 40:
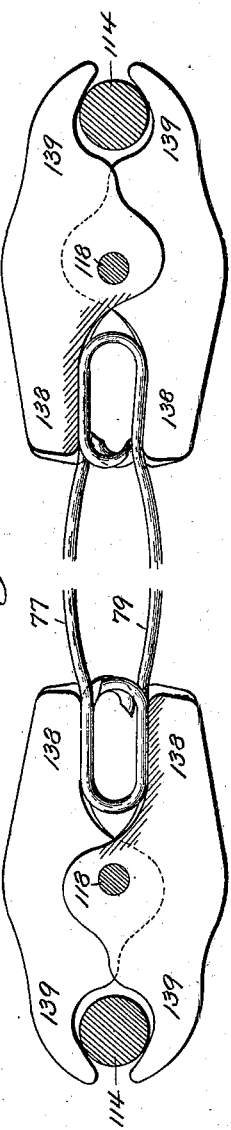
Figure 41:
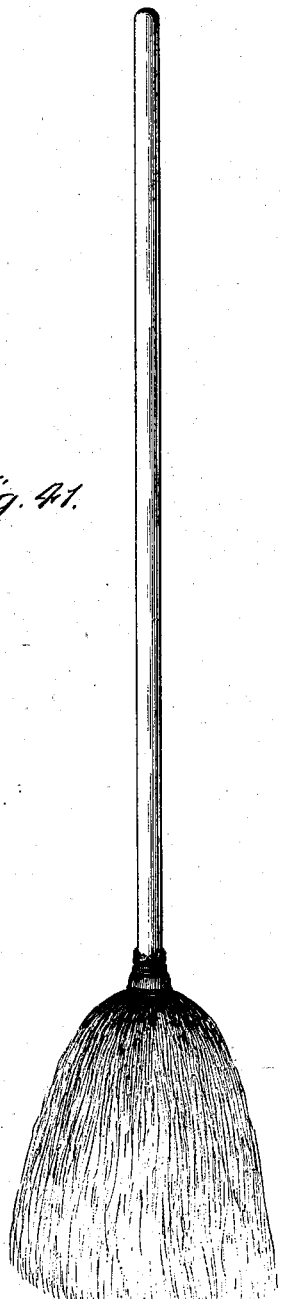
Figure 42:
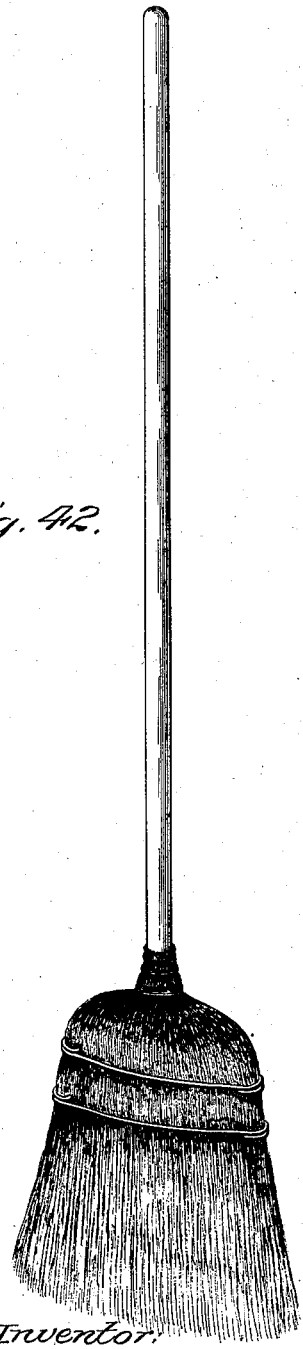

Figure 1 is an elevation of the feed side of my machine, and Fig. 2 is an end elevation. Fig. 3 is a plan section on line 3 of Fig. 1 in the direction of the arrow, showing the parts in initial position ready to receive a broom-blank. Fig. 4 is a similar view showing the parts in the second position with the wire-benders moved forward to grasp the binding-wires. Fig. 5 is a similar view showing the parts in the third position, the clenchers moved into engagement with the wires, and the benders left idle in the rear of the revolving carriers or heads. Fig. 6 is a similar view of the parts in the fourth or final position, showing the plunger forced into the revolving heads and the clenchers in the final act of seating and locking the wires in the broom. Fig. 7 is an enlarged fragmentary view of one of the revolving heads. Fig. 8 is a view, partly in section and partly in elevation, of one of the revolving heads looking in the direction of the wire-benders. Fig. 9 is a similar view of the same head after it is turned over to bring the clenchers into view. Fig. 10 is a transverse section of the head on line 10 of Fig. 7 looking in the direction of the arrow. Fig. 11 is a similar section of the same, showing the plunger for forcing the clencher-jaws together in the act of clenching the wires. Fig. 12 is a detail perspective of the end of one of the revolving heads, showing the cam-gate in its initial position. Fig. 13 is a similar view in an advanced position. Fig. 14 is a similar view showing the parts in their return movement during the revolution of the head. Fig. 15 is an end elevation of a revolving head. Fig. 16 is a detail sectional view of a revolving head on line 16 of Fig. 7. Fig. 17 is a similar view on line 17 of Fig. 7. Fig. 18 is a detail section on line 18 of Fig. 15 of the spring-finger device around which the wire ends are curved and which automatically releases the wires on the return movement of the revolving heads. Fig. 19 is a detail section on line 19 of Fig. 7 of a revolving head, showing the clencher-jaws opened. Fig. 20 is a similar view showing the clencher-jaws compressed or closed. Fig. 21 is a detail section of a revolving head on line 21 of Fig. 10, showing the spring-pin. Fig. 22 is a face view of the pinion on the end of the revolving head, showing the cam-locking grooves. Fig. 23 is an end view of one of the heads with the pinion, binders, and clenchers removed. Fig. 24 is an end view, partly in section and partly in elevation, of the dies and the cam of the press for pressing the upper die onto the broom-blank. Fig. 25 is a similar view showing the position assumed by the parts when the dies are brought together to shape and compress the broom-blank. Fig. 26 is a bottom view of the upper die, and Fig. 27 a top view of the lower die. Fig. 28 is a section on line 28 of Fig. 26, showing the construction of one of the catches for holding the upper wires in place. Fig. 29 is a sectional view on line 29 of Fig. 27, showing the slots in the die for the entrance of the benders and clenchers. Figs. 30 and 31 are detail views of the cams for forwarding and withdrawing the heads from operative position at the sides of the dies, the first view showing them in their initial or extended position and the second view in their second or advanced position. Fig. 32 is a detail perspective of the cam or finger for operating the rock-shaft. Fig. 33 is a similar view of the device for adjusting and regulating the play of the rock-shaft. Figs. 34, 35, 36, and 37 are diagrammatic views illustrating the action of the benders upon a pair of wires. Figs. 38, 39, and 40 are diagrammatic views illustrating the action of the clenchers upon a pair of wires. Fig. 41 is a perspective view of a broom-blank. Fig. 42 is a perspective view of a completed broom.

Throughout the drawings, A indicates the frame of my machine, which it is desirable to construct of heavy casting capable of enduring great strains without springing, and thereby interfering with the nice adjustment of the operative parts of my machine and also of supporting the heavy press mechanism necessary for forcing the dies together and shaping and compressing the broom-blank. The frame A consists, preferably, of a bed B for supporting the revolving heads and the lower die and sustaining the heavy pressure of the press, and an open frame C, provided above with an upward extension D for supporting and holding in place the press F. The revolving heads, the rack upon which they turn, and the cam-gate attachment are mounted on adjustable base-frames H.

The press F may be of any suitable construction for forcing the dies together upon the broom-blank and exerting thereon a sustained high pressure sufficient to shape and press the blank into approximately its smallest compass and for withdrawing this pressure and affording a space to change blanks after each successive operation. It is obvious that the amount of pressure may be varied within certain limits, according to the size of the blank operated upon. In operating upon a blank of the ordinary store size, known to the trade as a "two-pound broom," excellent results are obtained by applying a pressure of about ten tons. In the drawings I have illustrated a press of this character conveniently controlled by the foot of the operator. Power attached to the pulley 54 revolves it in the direction of the arrow $a$, any suitable mechanism being used for throwing the pulley in and out of engagement with its shaft 53, thereby attaining intermittent power for raising and lowering the upper die. Power is transmitted by gears to shaft 55, which turns cam 56, to which the die beam or plunger 57 is eccentrically attached in such manner that a revolution of the cam alternately raises and lowers it along the perpendicular, as shown in Figs. 24 and 25. The bottom of the die-beam 57 is leveled and the upper die 50 secured to it by screws 58 and 59. This construction permits the removal of the upper die and the substitution of a different-size die when it is desired to adjust the machine to operate on blanks of other sizes. This adjustment is hereinafter more fully explained. The play of the beam may also be altered to bring the dies nearer or farther apart on the downward stroke by loosening the nut 126 and raising or lowering the beam in slot 127 on the beam, thus shifting the point of attachment to the cam, or by other suitable means. Directly beneath the die 50, in accurate registration with it, is the lower die 51, secured to the bed B by screws 81 and so placed that when the upper die is lowered the edge 60 of the upper die and the rim or flange 61 of the lower die shall approximately contact, the outlines of the two dies being similar. The two when thus brought together form the conventional broom outline illustrated in Fig. 42. It is, however, obvious that modifications of this broom-shape outline may be obtained by using dies of different shapes and sizes. The dies are therefore detachable, and adjustments hereinafter described are made for the substitution of dies of other sizes and shapes. Within their rims or edges both the upper and lower dies are recessed to form, respectively, the upper and lower sides of the desired broom shape. The rims or edges of both dies are cut away and the interiors recessed at 75 to admit the handle of the broom-blanks, and both dies are cut away on the edges in the zone where the wires or bands are to be placed to permit access by the benders and clenchers hereinafter described. There are four of these nooks or openings in the upper die registering with four corresponding nooks or openings in the lower die, (numbered in the drawings, Figs. 26 and 27, 129, 130, 131, 132, 133, 134, 135, and 136,) adapted to afford access to the benders and enable them to curve the wire ends around the broom edges. On the interior of the openings above mentioned are the cuts or apertures adapted to afford the clenchers access to the wires and space for turning the wires back around the edges and over and under the straw, thereby forming the end loops of the binding-wires. These apertures also register those below with those in the upper die and are numbered 64, 65, 66, 67, 69, 70, 71, and 72. For convenience I will call that portion of the broom-blank around which the binding-wires are to be placed and the parts of the blank immediately adjacent thereto the "binding zones," the one nearest the handle the "upper" binding zone, and the one farthest from it the "lower" binding zone. In order to give sufficient room for the operation of the benders and clenchers and to permit them to seat the wire ends around enough of the broom-straw to give a firm grasp thereon, I prefer to cut the slots above described, so that when the dies are superposed about one-fourth of each binding zone is exposed to view on each end thereof, the slots being of width sufficient to freely admit the clenchers and benders. It is in these exposed parts of the broom that the free ends of the wires are bent, looped, and seated within the straw by the benders and clenchers hereinafter described. The binding-wires are carried above and below the binding zones in proper position. Any suitable means may be used for holding them securely in place. As illustrated in the drawings, they are carried by the dies, which are provided with grooves to receive them. In order to prevent them from crimping or sliding endwise when the ends are pushed up and bent by the benders or from sliding and crimping because of inequality in the temper, the wires should be buried or indented into the straw. This affords a friction edge, and the wires are held so firmly that force exerted longitudinally on the free ends which project beyond the dies will invariably bend rather than slide them lengthwise. This construction has the further advantage of preventing the wire from slipping up or down on the completed broom and is in other respects advantageous. To provide this friction edge or indentation into the straw, grooved steel bars are inserted across the dies in registration with the median of the binding zones. These bars are set in the dies in proper position flush with the surface, the grooves which extend lengthwise the bars on their exterior surfaces being adapted to cover or fit one half the diameter of the wire, having the other half protruding beyond the surface to form the friction edge or ridge above mentioned. These bars are shown in Figs. 24, 25, 26, and 27. The bar for the upper zone in the upper die is denoted by 62. The corresponding bar in the lower die is 73, while bars in the upper and lower dies for the lower binding zone are respectively 63 and 74. The groove in each bar is indicated by the number 76. While I prefer to use two pairs of superposed bars, a greater or less number may be used, according to the number of binding-wires which it is desired to secure around the broom. It is also obvious that other material may be used in the construction of the bars. The binding-wires should be of such size and material as to rigidly maintain the compression and shape of the broom and at the same time adapted to bend without rupture or breakage. Nine to twelve gage Bessemer steel annealed wire has been found suitable for brooms of ordinary size. The wires are cut on the bias or otherwise suitably pointed to readily penetrate the straw. In the construction of a broom of the ordinary size I prefer to cut the wires for the upper zone 77 and 79 in approximately eleven-inch lengths and those for the lower zone 78 and 80 in approximately foot lengths. Inserted in their respective grooves the wires in the lower die are held by gravity and those in the upper die by suitable catches, preferably the spring-catches 68. In Fig. 28 I have shown the spring-catch 68, the curved finger of which projecting under the groove will hold the wire and readily sink into the straw in the pressing operation and be drawn out of engagement by the weight of the broom when the upper die rises. Spring-catches of the same construction serve a like purpose at other suitable points along the upper wire-grooves. To obviate possible collisions between the ends of upper and lower wires in the seating operation, the grooves are arranged so that when the dies are superposed the projection of each of the upper grooves upon the lower will cross the latter about midway of its extent at an acute angle, thus bringing the free ends of the lower wires placed therein out from under the corresponding ends of the upper wires. (See dotted lines in Fig. 27.) Before applying pressure the wires are adjusted so that their middles shall approximately coincide with the longitudinal medians of the dies. Thus the free or projecting end at one side of the dies will be equal in length to the opposite free end. This adjustment may be had in a variety of ways, preferably by the stop or distance-measure 82, adapted to be thrown forward in a plane in alinement with the wire ends a distance from the longitudinal median of the dies approximately equal to half the length of the wire and to act as a stop against which the wire as it lies in the groove may be thrust endwise. By setting this stop at an angle it is adapted to serve as a stop for the wires of both the lower and upper binding zones which, as heretofore stated, are of unequal length, the pair for the upper binding zone being the shorter. The stop is mounted on crank-arm 83, attached to a loose sleeve on the forward rock-shaft 120 of my machine in such manner that it may be shifted to bring the stop nearer or farther from the median of the dies, according to the length of wires used, and turned to throw it backward and forward between the dies and the heads. After the adjustment of the wires is accomplished the arm 83 is revolved on its shaft and the stop or distance-measure is withdrawn and assumes the position illustrated in Figs. 1 and 2. After the adjustment of the wires the broom-blank is inserted, the handle resting on the support 84, the straw in die 51, and the press F is put in operation to lower the die 50 and to exert upon the broom-straw the continuous high pressure necessary to shape it between the dies, to take up therein the possible future shrinkage, and to hold it firmly and securely in place while the bands or wires are bent and seated. I have shown the dies as carrying four wires adapted to be secured about two binding zones, which I have found adequate for an ordinary broom, though the number used may be greater or less. Benders and clenchers are provided operating on each side of the dies. Both sets are placed side by side on a revolving head or turning carrier adapted to successively advance and withdraw the benders in suitable course and thereafter to advance and withdraw the clenchers.

The heads M and N, placed at each side of the dies, are similar in construction, so that numbers used in describing the attached parts and construction of one head apply also to the other. Both heads have an advancing and withdrawing movement along the bed B and a turning or revolving movement about their axes. These two movements are communicated from the shaft 86, which is provided with two cylinders having cam-grooves on their peripheries, both cylinders being operated by intermittent power so graduated as to turn the shaft and cylindrical cam-surfaces a half-revolution from right to left and from left to right. This may be done by any suitable mechanism. As shown it is done by means of lever 85.

Referring to Figs. 30, 31, it will be seen that the shaft 86 is provided with two cylinders 128 and 128$^a$, the former adapted to rotate with shaft 86 beneath the head M and the latter beneath head N. Upon these cylinders are placed the cam-grooves 87, into which project spools or roller ends 88, each secured to the head M or N. As the shaft is rotated the spools 88 follow the grooves 87 around the cylinder-surface, pulling the heads together along the same horizontal plane when the shaft is given a half-turn in one direction and apart when it is rotated in the opposite direction. The size of the cylindrical surfaces 128 and 128$^a$, the pitch of the thread 87, the position of the rollers 88, the position of the heads upon the bed B, and the position of the benders or clenchers thereon are such that when the shaft 86 and surfaces 128 and 128$^a$ are turned from the position occupied in Fig. 30 to that occupied in Fig. 31 the heads are brought up nearer the sides of the dies and the benders (or clenchers if the benders are in their rearward position) are brought into operative engagement with the ends of the wires in the apertures of the dies. The benders, constructed of steel or other hard metal, are provided with an inclined face adapted to be forced longitudinally against the free ends of the wires and to bend that portion of the wires projected from between the dies in an approximately fixed and predetermined curve. The benders are thrust by the approaching heads into the openings 129, 130, 131, 132, 133, 134, 135, and 136 of the dies. Benders adapted to engage the ends of wire 77 (the top wire of the upper binding zone) are shown in Fig. 34, bender 89 mounted on head N and bender 90 on head M. Benders adapted to engage the ends of wire 79 (which is the lower wire of the top binding zone) are shown in Figs. 3 to 9, inclusive, bender 91 mounted on head N and bender 92 on head M. On the outer surface of each are the guideways or bending-grooves 98, adapted to receive the wire and turn it in the desired curve. These grooves are so placed upon the plane of the inclined bender that each will register with a wire end, and the face of the bender is so inclined and of such an angle that the end is turned by the approaching heads M and N and gradually curved backward, the lower wires around and over the straw and the upper wires around and under it, to assume the position shown in Fig. 36. Two diagonally opposite benders are provided for each wire, the upper benders throughout being oppositely inclined upward toward the dies and the lower benders oppositely inclined downwardly toward the dies. The benders are all similar in construction to benders 89, 90, 91, and 92. As the superposed wires 77 78 and 79 80 are not parallel in their respective planes, but crossed, as shown in Fig. 27, the benders to engage opposite ends of a given wire are necessarily diagonally opposite. As the heads M and N are pulled together the ends of the wires contact with the benders in the grooves 98 and are bent in the direction of the incline from the dies. I give to the ends of the wires a final curve of smaller arc than that obtained by contact with approaching inclines, so that the clenchers may properly seat the ends within the straw. To accomplish this, I provide each bender with the curved projecting surface 137 and turn the groove 98 near its outward termination on this surface toward the dies in a short return curve over or under the straw. To provide a turning and stop surface for the wire ends, I attach to the benders the spring-finger 100, (shown in Figs. 15, 18, and 37,) secured against the bender by spring 101. During the turning of the wire the finger contacts firmly against the bender, so that the wire end is held firmly in slot 102; but as the benders are drawn apart along the diagonal the wire rides up the inclined end surface or taper 155, pulling the finger against the tension of spring 101, which yields, thereby parting the finger and bender and permitting the curved wire end to push the finger aside and withdraw without injuring or marring the curve. The operation of the cam-gate, hereinafter more fully described, is such that the wires are free of the benders before the head begins to revolve on its axis. The benders are bolted to the heads by bolts 97, as shown in Figs 16 and 17. Figs. 3, 34, and 35 show the benders in their initial or retracted position ready to be thrust forward against the wire ends. Figs. 36 and 37 illustrate the shape of the curve produced. In using dies of other sizes than those shown in the drawings the only adjustment which the benders require is the alteration of the path of travel of the heads—nearer the dies for smaller brooms and farther for larger ones. After the bending of the wires the benders are withdrawn by retracting the heads M and N from their working position at the sides of the dies and turning the latter over, so as to bring the clenchers into line with the bent wires, thereby throwing the benders into the rear. The clenchers and benders are securely mounted on opposite sides of the heads, so that a half-revolution of the head will throw the forward mechanism to the rear and advance the rear mechanism. The adjustment of the parts is such that the half-turn of the pinions 103 in locked position about the heads M and N is made only during the withdrawing movement or retraction of the heads, while the free half-turn is made during the advancing movement, and this turn is sufficient to aline the operative forward parts with the wires and retain the idle parts in the rear. This result may be obtained by mounting on the head trunnion 104, carrying the loosely-mounted pinion 103, traveling on rack 107, its teeth meshing therewith. In the first forward movement, Figs. 3 and 4, when the heads are drawn together to move the benders forward, the pinions 103 make a half-revolution in the direction of the dies. The adjustment of my machine is such that this half-turn is sufficient to carry the heads and benders forward into engagement with the wires. On the return movement, however, as the benders are withdrawn this pinion is locked to the head and making a half-revolution in the return direction turns the head over, throwing the benders in the rear and the clenchers forward in line to engage the wires. This locking is accomplished by providing the pinion 103 on its inner face with inclined groove 105, Fig. 22, the ends of which form shoulders adapted to engage the spring-pressed pin 106, Fig. 21. The head in its forward movement is held in horizontal position by means of dog 108, Figs. 12, 13, and 14, adapted to engage notch 109 or notch 110, Fig. 23. It will be seen that when the benders are forward the dog will be in engagement with notch 109 and with 110 when the clenchers are forward. The dog 108 turns on pivot 111, the latter extending outward and having secured to its outer end a spring 112 for holding the dog in engagement with the notches. In the forward movement of the heads the dog 108 passes under cam-gate 113 and raises it, thereby leaving the position of the head unaltered; but in the backward or return movement the dog coming in contact with the face of the cam-gate rides upon the inclined face and is thereby raised out of notches 109 or 110, as the case may be. This permits the shoulder of the inclined groove on pinion 103 to engage pin 106, thus locking the head and pinion and causing the former to turn with the latter one-half revolution, at which time the dog 108, having passed over the cam-gate 113, is forced into notches 109 or 110 by means of spring 112, which brings the parts back into the initial or horizontal position.

Having thus described the means for forwarding and withdrawing the benders, turning them over to the rear of the heads M and N, thereby bringing to the front the clenchers, and for forwarding them into engagment with the bended wires, I next proceed to describe the operation of the clenchers.

The clenchers are mounted side by side on the heads M and N. They consist of jaws 138, pivoted at 118, and the heels or reins 139. The heads are hollow to permit the operation therein of the plunger 114 and at the respective junctions with the clenchers are provided with openings or apertures 140, adapted to admit heels 139 and allow them freedom of motion for retraction and compression, thereby operating jaws 138. Jaws 138 are normally held open and apart by springs 123, attached at the ends to screws 124 on the heads and screws 125 on the jaws. Fig. 10 shows the heels compressed by the tension of the springs 123 to fit closely about the small or taper portion of notch 122 on plunger 114, resting against shoulder 141. In this position the plunger is held with one end projecting from the head by spring 121, coiled at the opposite end. Fig. 11 shows the position which the parts assume when the jaws are clenched by moving the plunger 114 lengthwise into the head against the spring 121, thereby compressing it and causing the heels to ride up the inclined surfaces of the notch and spread apart. While other spreading devices may be used, I prefer to use this taper notched plunger, with the surface of the notch shaped like the surface of a trilateral frustum of three converging planes as affording a better purchase on the heels and as being less likely to loosen and permit the other parts to rattle. The plunger is forced into the head by pressure exerted on its projecting end, and when this pressure is removed it is returned to the normal position by the action of spring 121.

As heretofore stated, the benders, clenchers, plungers, and turning-gear upon one of the heads M or N is exactly similar in construction to the like parts on the other head, so that the description of one will apply equally to the other.

In their normal position the plungers 114 project over the rock-shaft 120, which is adapted to turn the blocks 142 in the arc of a circle. These blocks are so placed that when the heads are brought into working position at the sides of the dies the blocks may be rocked forward to press the plungers into the heads or rocked back to permit the plungers to assume their normal position. Rock-shaft 120 is operated by shaft 86 in any suitable manner, preferably by mounting a roller 144 on the lever 85, adapted to strike the inclined surface 145 as the lever 85 is turned from the position occupied in Fig. 3 to that assumed in Fig. 4, and thereby swing the cam 143 downward, a movement which forwards blocks 142. When the pressure on cam 143 is withdrawn, the shaft 120 is acted upon by spring 150, which rocks it back and pulls the blocks 142 out of the path of travel of plunger 114. An adjustment of the cam 143 is shown in Figs. 32 and 33 by which the arc of rotation of shaft 120 may be changed. This is done by attaching the piece 146 to cam 143 by a bolt or other suitable fastening inserted in the openings 147 and through the slot 148 and the opening 149. By loosening the bolt in 148 and 149 the piece 146 may be swung about the bolt in 147 as a center and raised or lowered above or below the plane of 151, thereby increasing or decreasing the arc of rotation of shaft 120. The arrangement of the parts in my machine is such that a substantial decrease in the arc of rotation of shaft 120, and consequently of blocks 142, drives the plungers only part way into the heads, and thereby diminishes the movement of the clencher-jaws, while an increase of the arc of rotation of the rock-shaft increases the arc of movement of the jaws. These alterations are desirable when changing the machine to operate upon larger or smaller broom-blanks, since in the construction of a large-sized broom the wire ends cannot be as closely clenched and seated as in the construction of a smaller broom. In the clenching operation the jaws are advanced open, the grooves 119 (one on the upper and one on the lower jaw) so arranged that the first will register and slip over the top of the bent wires and the second under the bottom thereof. As the heads M and N approach, the jaws are driven against the free ends of the wires and turn them in reverse direction, accentuating and increasing the abruptness of the end curves made by the benders, forcing the pointed ends of the upper wires gradually back and under the straw—i. e., on the opposite side of the blank—and the pointed ends of the lower wires gradually back and over the straw in a similar manner until the two wires assume the position illustrated in Fig. 39. It will be observed that the ends are turned into the straw. This manner of seating the wires and turning them around a considerable number of the edge wisps of straw in the blank gives them additional security and prevents them from being slipped out of the indentation which the dies and grooves cause the wires to make across the binding zones. The above-described end loops made by the benders and clenchers each surround and grasp a considerable portion of the straw in the blank, though adjustment of the heads M and N to operate farther or nearer the rims of the dies will cause the benders and clenchers to make a shorter or longer loop, as desired. The benders operate in the nooks or openings 129, 130, 131, 132, 133, 134, 135, and 136. The clenchers pass through these nooks and operate in the openings 64, 65, 66, 67, 69, 70, 71, and 72, Figs. 26 and 27. In Fig. 40 the plungers are shown thrust into the heads, thereby closing or bringing together the jaws. This operation elongates the loop, forces the ends down toward the exterior wire, causing the ends of the two wires to penetrate the straw, and completes the seating operation. Fig. 6 shows the position occupied by the various parts during the final clenching operation. The cam-shaft 86 is then revolved to withdraw the heads, the pressure on cam 143 is simultaneously released, and the shaft 120, with blocks 142, pulled back by the tension of spring 150, thereby releasing plunger 114 and opening the jaws. In the return movement of the heads pinions 103 are locked to the heads, as heretofore described, thereby turning them a half-revolution and bringing the benders forward ready for operation. The press is then operated to elevate the upper die and the completed broom removed from the machine.

The heads or carriers M and N rest and are secured upon base-plates H, one supporting each carrier. These base-plates are slid into grooves in the bed-plate B of the machine, to which they are fastened at 154, Fig. 6. By moving them together or drawing them apart the carriers are advanced to operate nearer or farther from the medium of the dies, according as large or small size dies are used, and it is convenient to provide on the frame B a scale graduated to measure the distance necessary to slide these base-plates H to adjust the parts for operation with dies of a given size.

While I have illustrated suitable means for embodying my invention, the construction may be varied in many particulars without departing from what is essential.

Believing the broom which is constructed by my machine to be novel and to have material advantages, I reserve it for another application to be filed concurrently with this.

Having thus described my invention, what I claim as new, and desire to secure by Letters Patent of the United States, is—

1. In a machine for binding brooms, the combination of shaping and compressing mechanism, means for holding wires in binding position about said straw and means for curving, seating and turning the ends of the wires into the straw, for the purposes described.

2. In a broom-binding machine, in combination with compressing and shaping mechanism, and traveling heads on either side thereof, a shaft beneath said heads having cylinders provided with cam-grooves, spools or rollers on said heads projecting into said grooves, said heads having bending and clenching mechanism thereon and means for turning said shaft whereby said heads are advanced and withdrawn, for the purposes described.

3. In a machine for binding brooms, traveling heads having bending and clenching mechanism on opposite sides thereof, pinions adapted to roll along a track and carry said heads, means for advancing said heads and for causing said pinions to turn loosely about them during said advance, and means for withdrawing said heads and locking said pinions securely to said heads during said withdrawing movement, whereby said head is turned over during said withdrawing movement, substantially as described.

4. In a machine for binding brooms, dies adapted to shape and compress the straw and to carry binding-wires on opposite sides of the broom so that the projection of one wire upon the other will cross the latter near the middle at an acute angle.

5. In a broom-binding machine, means for holding binding-wires in binding position on opposite sides of the broom, their ends projecting beyond the broom edges, cams adapted to successively advance and withdraw traveling heads and bring the ends of said wires into engagement with binding and seating mechanism mounted thereon, substantially as described.

6. In a machine for binding brooms, in combination with means for holding binding-wires on each side of the broom with ends projecting beyond the edge, benders having guideways adapted to contact with said ends, means for forcing said wire end to bend along said guideway, and a spring-finger adapted to stop said wire at the extremity of the guideway, for the purposes described.

7. In a machine for binding brooms, in combination with means for holding binding-wires on each side of the broom with ends projecting beyond the edge, benders having guideways adapted to contact with said ends, means for forcing said wire ends to bend along said guideways, and spring-fingers adapted to stop said wire at the extremity of the guideways, said guideways being so turned near their extremities and said fingers being so placed that the extremities of each wire are bent in a short curve, and means for withdrawing said benders without marring said curves, for the purposes described.

8. In a broom-binding machine, a pair of traveling heads adapted to be advanced and withdrawn along a track at each side of said broom, benders and clenchers oppositely mounted on said head, and means for turning said head about its axis during the withdrawing movement whereby the positions of benders and clenchers are interchanged.

9. In combination with means for compressing and shaping the straw of broom-blanks, and means for holding binding-wires in binding position, the ends extending beyond the edges of the straw, benders adapted to compress each wire at the ends, said benders having a guideway adapted to contact with said ends around the edges of the broom, and a spring-finger adapted to stop said wire at the extremity of the guideway, said guideway being so turned near its extremity and said finger being so placed that the extremity of the wire is bent in a short curve around said edges, and means for withdrawing said benders without marring said curves, for the purposes described.

10. In a machine for binding brooms, in combination with means for holding binding-wires on opposite sides of the broom with ends projecting beyond the edges thereof, benders having guideways and spring-fingers thereon adapted to curve the ends of the binding-wires about the edges of the broom and impart to the extremities thereof an abrupt short curve, means for advancing and operating said benders and withdrawing them without marring said curves, clenching mechanism adapted to force the ends of said wires together and hook and loop them into the straw near the edge of said broom, and means for advancing, operating and withdrawing said clenching mechanism.

11. In a machine for binding brooms, in combination with heads M and N, plungers provided with wedge-shaped portions operating therein, clencher-jaws 138 with heels 139 curved about said wedge-shaped portions, blocks 142, rock-shaft 120 adapted to press said blocks against said plungers, force them into heads M and N and cause said heels to ride apart on said wedge-shaped portions, thereby compressing said jaws, means for withdrawing said pressure, springs adapted to cause said heels to ride down said wedge-shaped portions and springs adapted to open said jaws, for the purposes described.

SAMUEL P. FRALEY.

Witnesses:
CHARLES L. HINE,
ROBERT CATHERWOOD.